Dec. 23, 1952 R. M. STREAM ET AL 2,622,810
WINDING APPARATUS
Filed Jan. 29, 1952 6 Sheets-Sheet 3
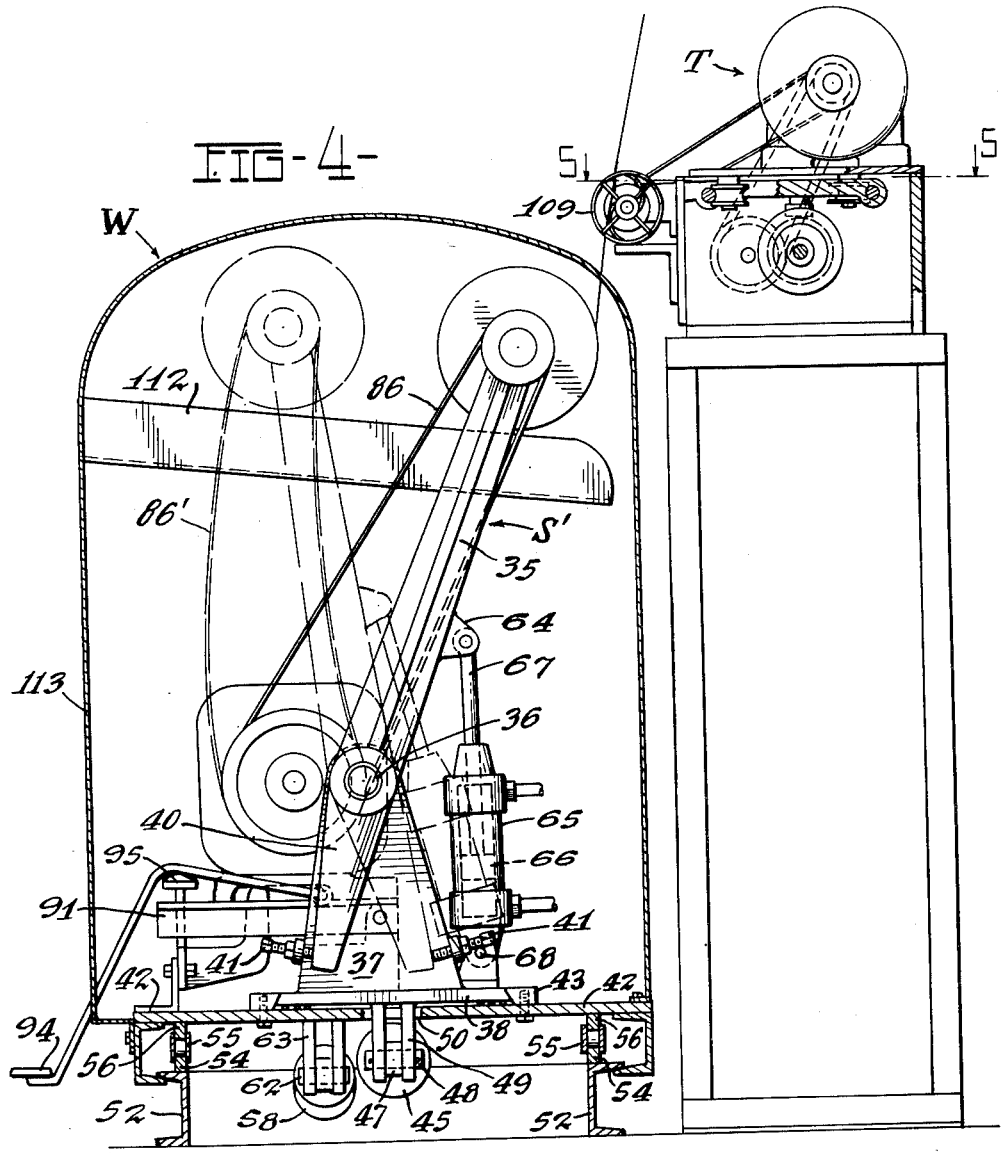
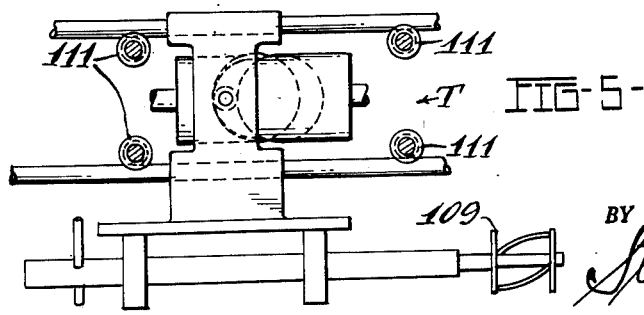
INVENTORS:
RALPH M. STREAM,
IVAN G. BRENNER.
BY
ATTYS.

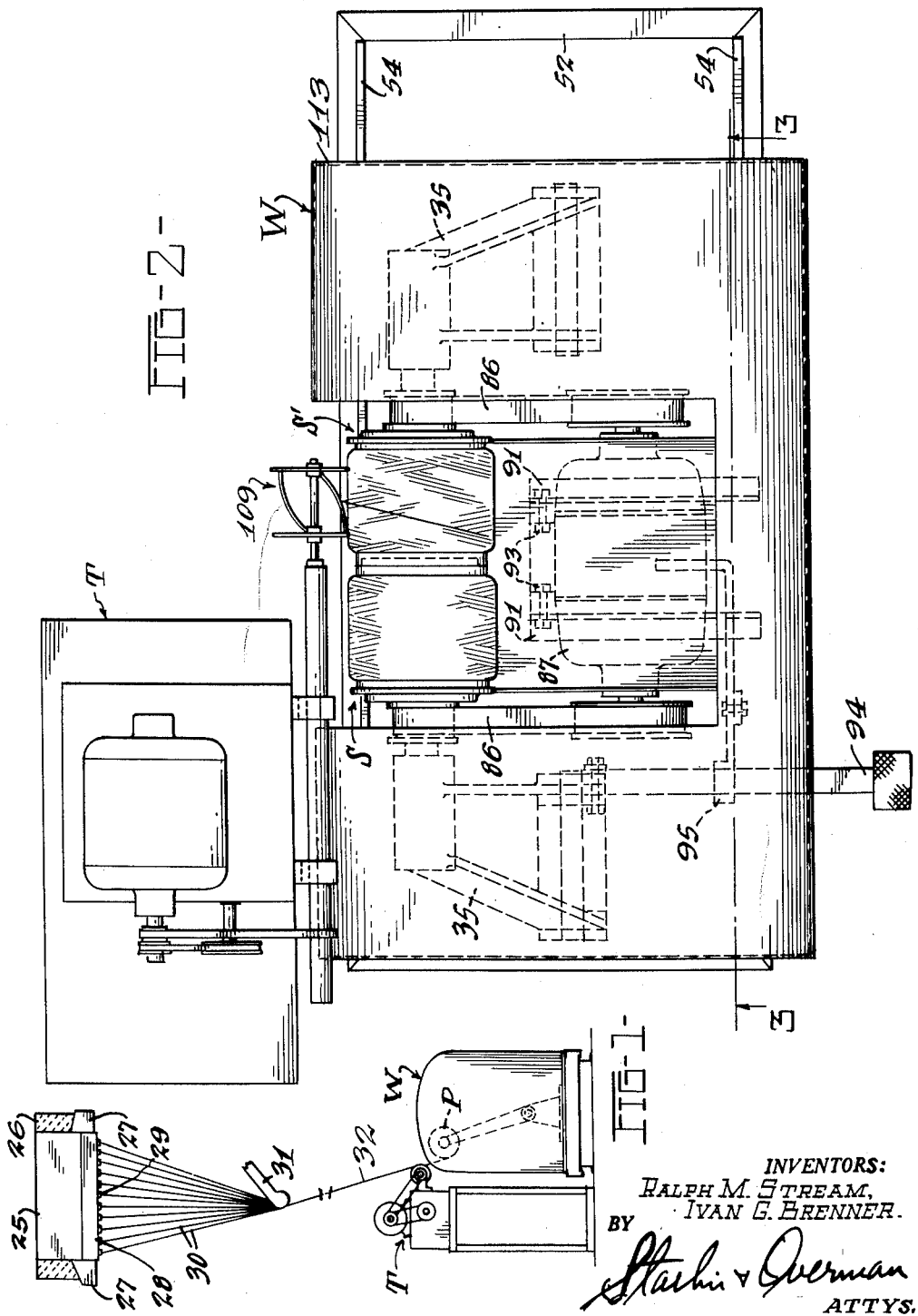

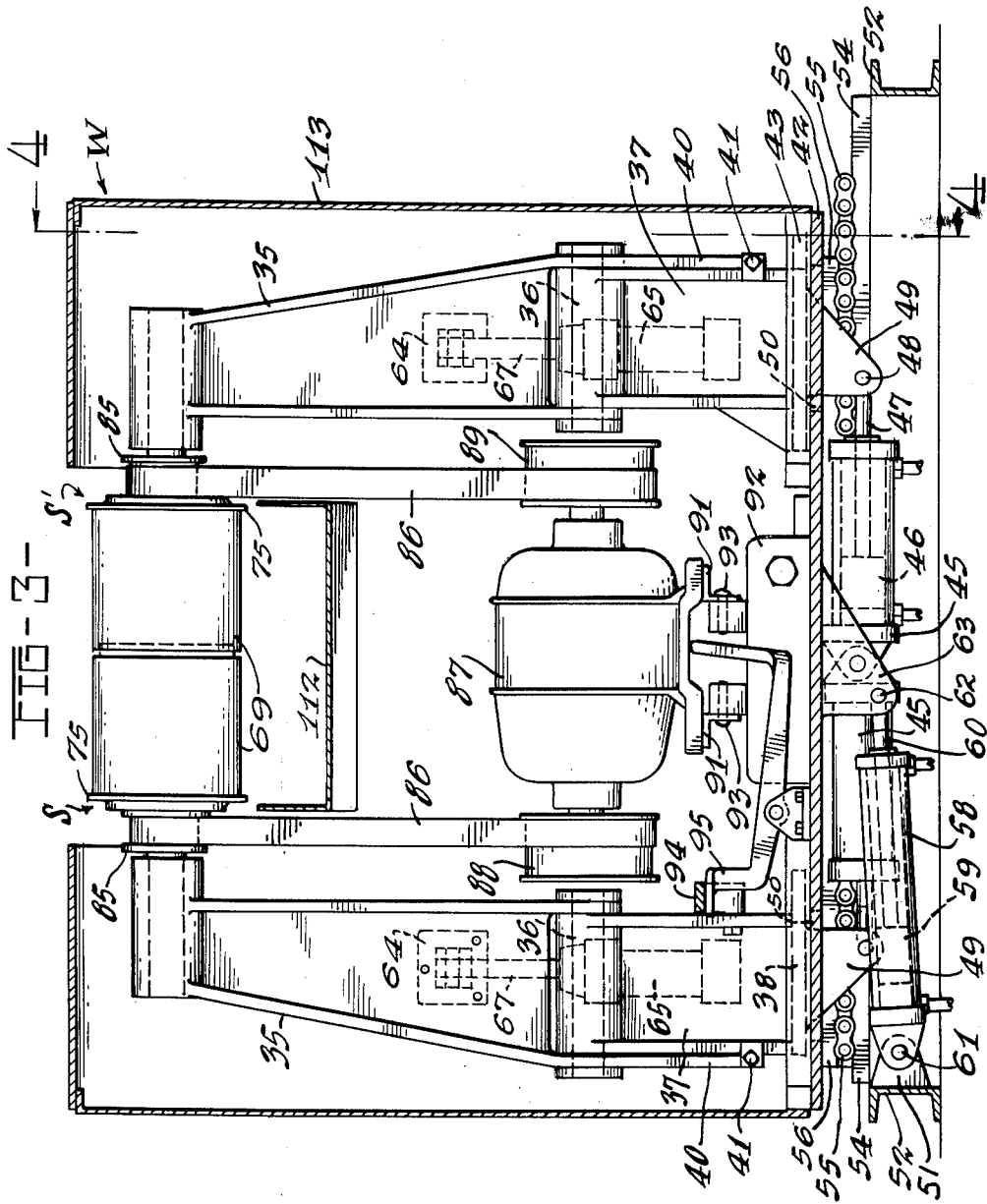

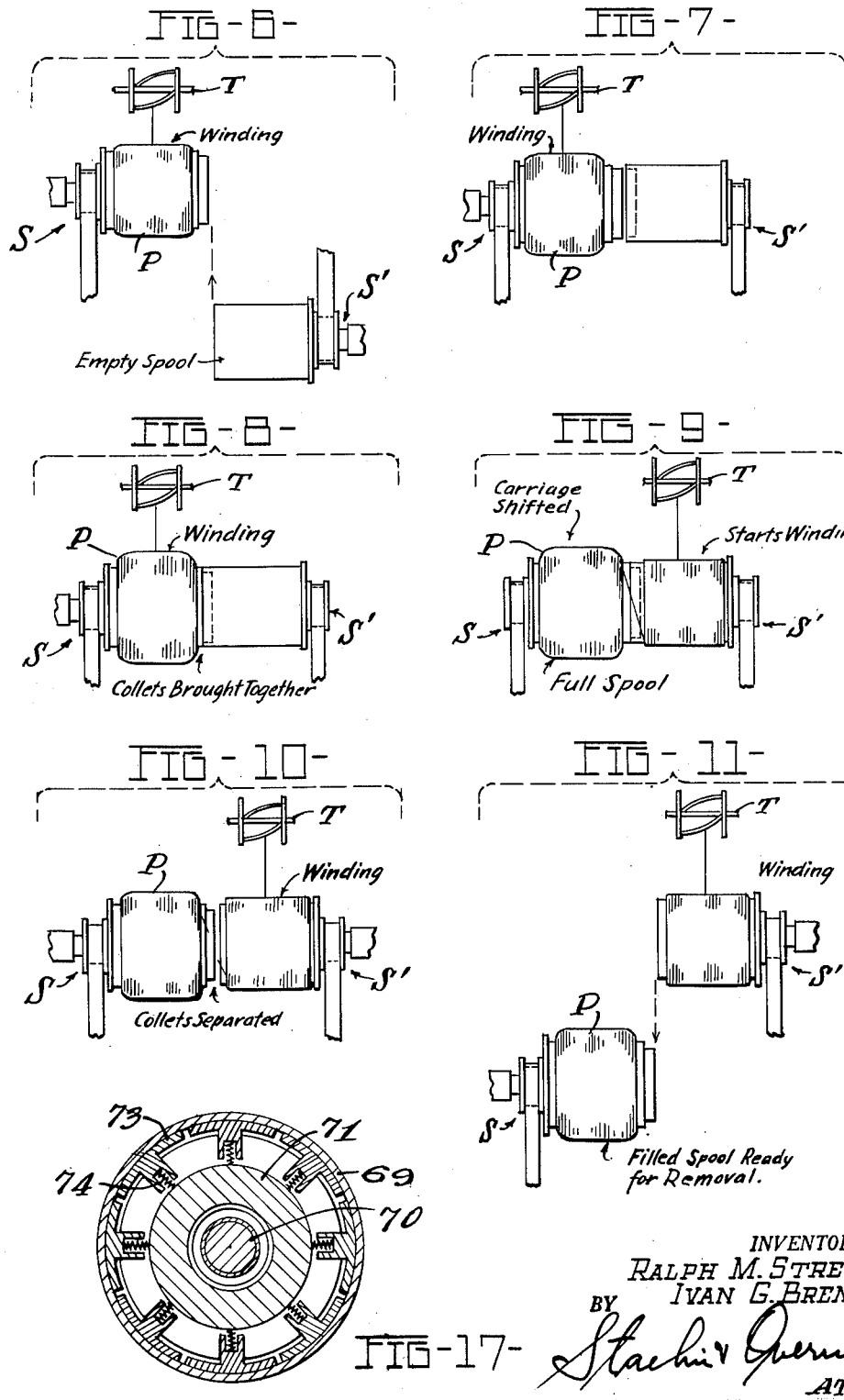

Dec. 23, 1952 R. M. STREAM ET AL 2,622,810
WINDING APPARATUS
Filed Jan. 29, 1952 6 Sheets-Sheet 5
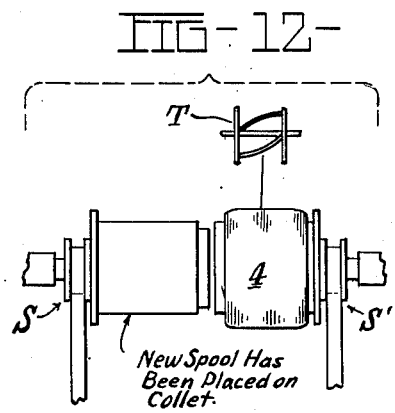
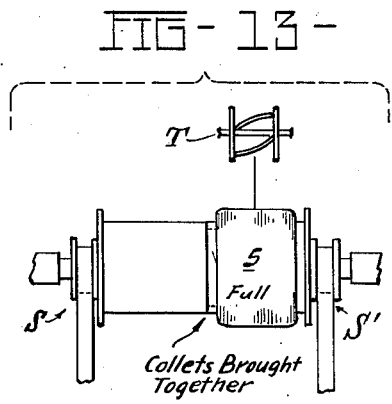
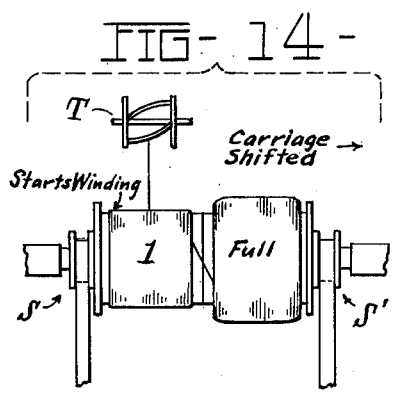
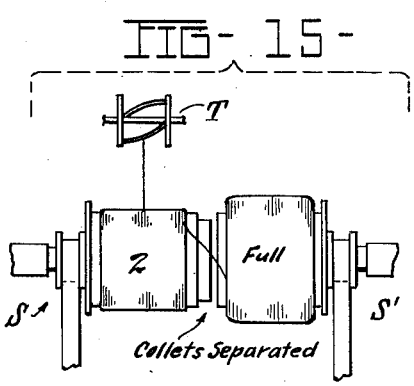
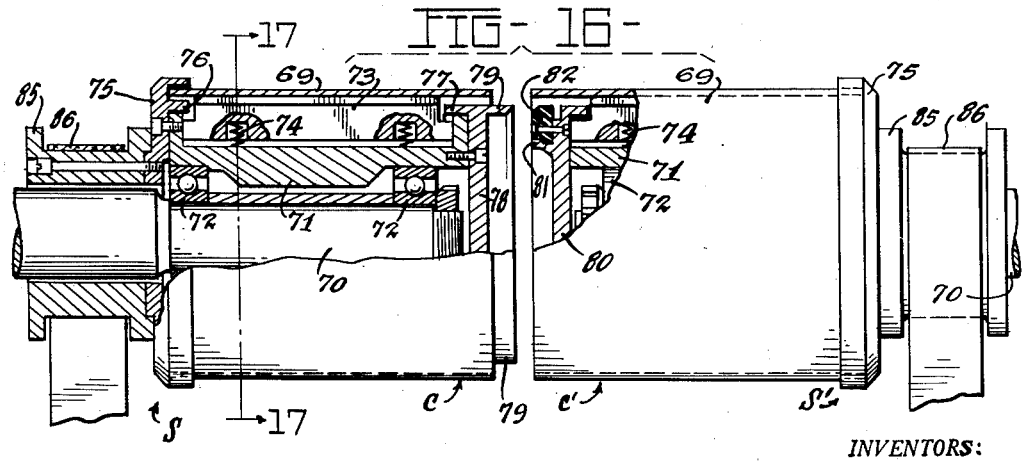
INVENTORS:
RALPH M. STREAM,
IVAN G. BRENNER.
BY
ATTYS.

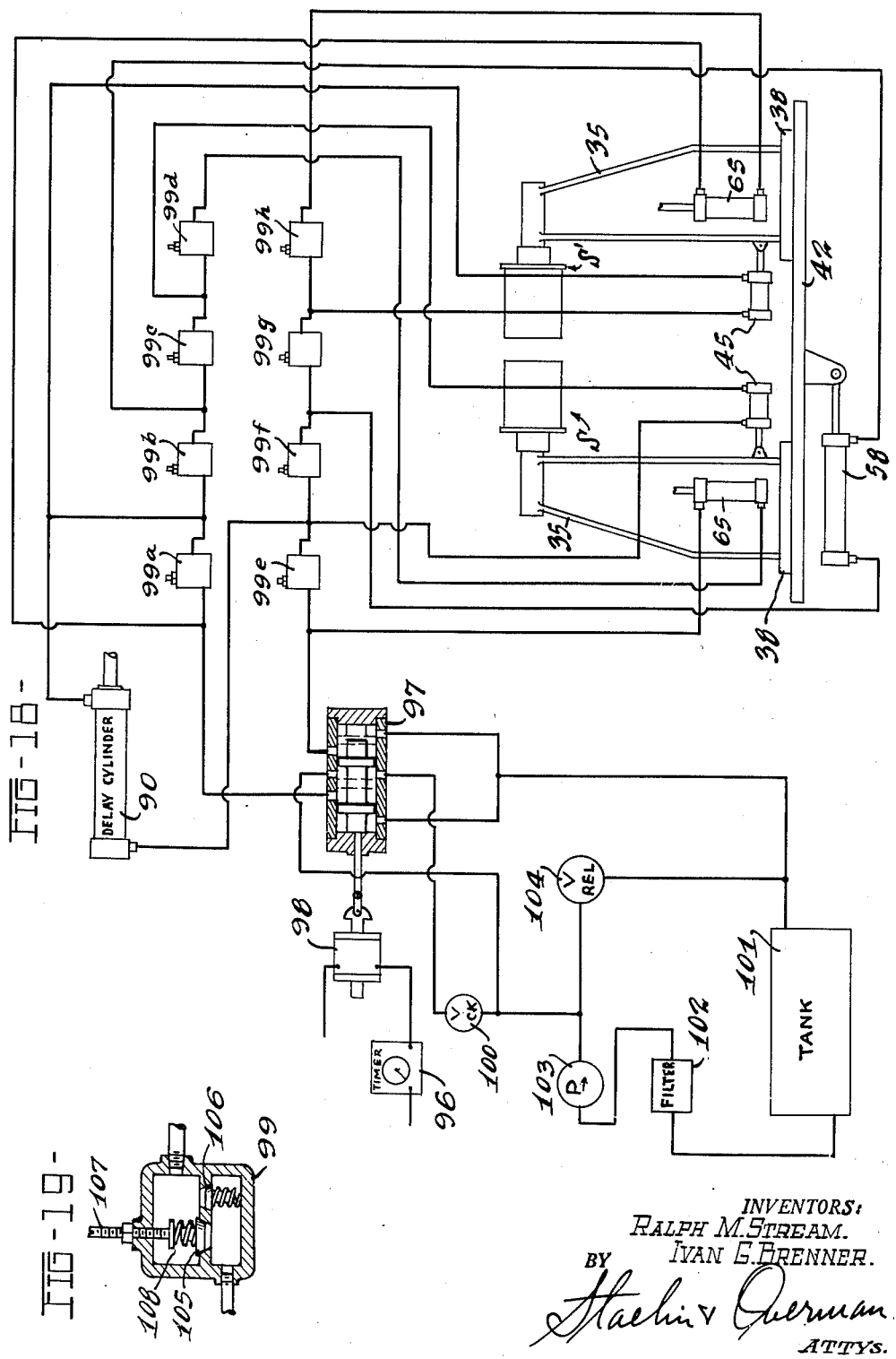

Patented Dec. 23, 1952

2,622,810

UNITED STATES PATENT OFFICE 2,622,810

WINDING APPARATUS

Ralph M. Stream and Ivan G. Brenner, Newark, Ohio, assignors to Owens-Corning Fiberglas Corporation, Toledo, Ohio, a corporation of Delaware Application January 29, 1952, Serial No. 268,739

9 Claims. (Cl. 242—18)

The present invention relates to improved apparatus for manufacturing fibrous material. It relates particularly to apparatus for packaging material in strand form at high speeds, and especially the production of strands of textile glass fibers and other thermoplastic or hardenable substances. The invention further embodies the improvement of continuously winding packages of strand material and exchanging the filled package with an empty package support tube without stopping the winding operation.

Textile glass fibers may be produced by flowing a multiplicity of streams from a feeder containing a supply body of molten glass by the application of a pulling force to the streams sufficient to attenuate the latter into a corresponding number of filaments. The filaments are gathered or grouped to form a strand which is then wound into a package on a spool. The spool serves as the attenuating means and is usually rotated at a very high rate of speed. When the desired amount of strand has been wound into a package on the spool, rotation of the spool is discontinued and attenuation is interrupted long enough to permit interchanging an empty spool for the full spool. After the spools have been changed, the glass streams are drawn by hand until the operator starts the winding of the strand onto the spool to initiate the winding operation. Thus attenuation is intermittent and must be started anew after each spool change with the result that much time is consumed getting all of the hundred or more streams of molten glass flowing properly from their source and attenuating properly into fibers.

The intermittent winding operation not only causes a loss of time while a filled package is removed and an empty spool replaced but also reduces or stops the flow of glass from the bushing. The stopping of the flow of glass between package changes is of greater importance to the winding operation than the actual loss of winding time during such changes. Under normal operating conditions, attenuation of the streams of molten glass is accomplished at winding speeds of 5,000 to 10,000 or more feet per minute. At these speeds certain critical conditions are produced which are pertinent to the control and operation of the bushing. In order to maintain uniformity of diameter in the attenuated strand of fibers, it is necessary as far as possible to accurately control the temperature of the molten glass in the bushing. The high speed movement of the strand produces currents of air which flow across the bottom of the bushing and exert a cooling influence on the glass as well as on the bushing itself. The temperature of the bushing is regulated by electrical means to compensate for such changes or variations as occur in the glass.

Stopping the winding operation for changing packages or because of mechanical failures causes the immediate heating-up of the bushing due to the lack of the cooling influence of air currents caused by movement of the strand. This often causes the loss of an unreasonable amount of time and the consequent loss of production until the strands can again be started. This restarting entails first manually inducing the flow of any streams that have ceased to flow and then winding the strand at high speed for a time on the end of the winding spindle before commencing the package. Under normal operating conditions, a bushing may operate continuously so long as the winding is not stopped.

It is a primary object of the invention to continuously attenuate and wind strand material without the interruptions ordinarily encountered in such operations.

Another object of the invention is to provide an apparatus for automatically producing wound packages of a predetermined size of strand material at high speed.

It is another object of the invention to provide an apparatus by which substantially all of the manual operations attendant to the production and winding of successive packages of glass fiber strands are eliminated.

Other objects and advantages of the invention will become apparent during the course of the following description, especially when considered in the light of the accompanying drawings, in which:

Figure 1 is a diagrammatic view of the present invention in operative relation to a fiber producing unit;

Figure 2 is a plan view of the apparatus;

Figure 3 is a side elevational view of the apparatus, parts being shown in section as indicated by line 3—3 of Figure 2;

Figure 4 is a vertical sectional view taken substantially on the line 4—4 of Figure 3;

Figure 5 is a detail sectional view taken on the line 5—5 of Figure 4;

Figures 6 through 15 illustrate diagrammatically the cycle of operation of the winder forming the present invention;

Figure 16 is a view, partly in section, of the rotatable package supports shown in substantially the relation indicated in Figure 15;

Figure 17 is a sectional view taken on the line 17—17 of Figure 16;

Figure 18 is a diagrammatic view of the hydraulic system employed in the apparatus; and Figure 19 is a sectional view through one of the sequence valves of the hydraulic system.

The present invention comprises generally a winder mechanism capable of operating at winding speeds of 5,000 to 15,000 feet per minute and is illustrated in connection with one form of apparatus for producing streams of material in a molten state which can be attenuated to fine fibers. While the winder may be adapted to wind substantially any type of material capable of being formed into a strand, it is particularly useful in the production of strands of thermoplastic or other hardenable substances such as resins and the like or siliceous materials, especially glass. The present description is directed particularly to the production of strands of fibers from molten glass.

One form of apparatus by which glass fibers may be formed is illustrated in Figure 1 of the drawings and comprises a container 25 or bushing to which glass forming materials are supplied and melted. The bushing is usually mounted in refractory insulation 26 and is provided at its ends with lugs for connection in a suitable electric circuit (not shown) by which the bushing is heated. The bushing is provided in its bottom wall 28 with a row or rows of orifices 29 from which streams 30 of molten glass flow by gravity. The streams are gathered into a bundle at a guide 31 to produce a strand 32 which is attenuated by a winder W as it is wound into a package P. Traversing mechanism T moves the strand back and forth as the package is formed.

Winder apparatus of this invention is illustrated in Figures 2 to 4 and comprises a pair of spindles S and S' each supported on the upper end of an arm 35 which is pivoted at its lower end on an upstanding bracket 37 formed on a slide plate 38. The arm 35 is provided on its outwardly facing side with a downwardly extending leg 40 adapted to engage adjustable stops 41 to limit the swinging movement of the arm 35 about the pivot 36 as illustrated in Figure 4. The slide plate 38 carrying the bracket 37 is mounted for limited sliding movement in the direction of the axis of the spindle and the pivot 36 on a plate 42 which forms the base or platform for the apparatus. Retaining gibs 43 bolted to the plate 42 provide slideways for the plate 38.

The movement of the plates 38 and the mechanism carried thereby serves to bring the spindles into contact with one another during the strand transferring interval as will be pointed out in the following description of Figures 8 and 13. Mechanism for moving the spindle carrying assembly is illustrated in Figures 3 and 4 and includes a pair of hydraulically operated actuating cylinders 45 pivotally connected one to the other at a common point on the underside of the plate 42. Each actuating cylinder 45 is provided with a piston 46 and piston rod 47 which is connected by pins 48 to ears 49 extending from the plate 38 through openings 50 provided in the plate 42.

The plate 42 which comprises the platform for the apparatus is adapted for movement parallel to the axis of the spindle S and S' and is mounted on a base 52. The base is in the form of a hollow rectangle made by welding together lengths of channel members arranged with one of the sides of the channels facing upwardly. Rails 54 are secured by welding to the opposed sides of the base 52 to provide parallel tracks on which the plate 42 moves. In order to facilitate movement of the plate 42, lengths of roller chain 55 are disposed on the rails 54 and a second pair of rails 56 bearing on the rollers of the chain 55 are secured to the platform 42. Thus the chain provides a rolling bearing surface on which the platform is supported.

Movement of the platform 42 for transferring the winding from one spindle to the other is accomplished by means of a hydraulic actuating cylinder 58 having a piston 59 and piston rod 60 therein. The actuating cylinder 58 is pivotally connected at one end by pin 61 to the ears 51 of base 52 and the piston rod 60 is connected by pin 62 to a pair of depending ears 63 formed on the underside of the platform 42.

The swinging motion of the arms 35 for moving the spindles into and out of winding position is controlled by hydraulic actuating cylinders 65 having pistons 66 and piston rods 67 therein. Each actuating cylinder 65 is pivotally connected at its lower end by a pin 68 to the slide plate 38 and piston rod 67 is connected to arm 35 by means of a clevis 64 bolted to the arm. The operation of actuating cylinders 45, 58, and 65 will become more apparent as the description proceeds. As can be seen by inspection of Figure 4, swinging arm 35 away from the traversing mechanism (loading position shown in dotted lines) causes belt 86 to be free of tension which results in slippage of the belt.

The spindles S and S' (Figures 16 and 17) carried by arms 35 each include a rotatable collet C and C', respectively. Each of the collets is adapted to receive a readily replaceable strand support tube 69 about which the strand is wound and which forms the core of the package. The tube 69 may be formed of either a rigid material such as hard rubber or a synthetic resin, or may be formed of a flexible material such as a fabric or treated kraft paper or the like.

The collets are substantially alike as will be brought out presently and each comprises a supporting shaft 70 secured to the upper end of the arm 35 and about which the collet rotates, see Figure 16. The collet includes a hub 71 supported for rotation on the shaft 70 on bearing 72 and is provided with a plurality of radially movable segments 73 as shown in Figure 17. The segments form the periphery of the collet and are normally urged outwardly by coil springs 74. The segments 73 are limited in their outward movement by an inner end plate 75 having an inwardly extending flange 76 and a flange 77 formed on an outer end plate 78.

The end plates 75 and 78 are bolted to the hub 71 as shown in Figure 16. The inner end plate 75 also provides a stop against which the package support tube 69 bears when placed on the collet. The end plate 78 on the spindle S is provided with an outwardly projecting annular flange 79 about which the strand is initially wound upon starting of the winding operation. With the collet rotating at a low speed the strand, which is being pulled by hand, is looped around the flange and attenuation commenced. As the collet gains attenuating speed the fully attenuated strand is guided onto the tube 69 for continued winding. The coarse strand wound about the flange 79 remains thereon until the filled package is removed later in the operation.

The collet C' of the spindle S' while being substantially similar in construction includes a modified outer end plate 80. The plate is formed with an annular shoulder 81 adapted to receive a ring 82 of rubber or other friction material. The ring is adapted to register with and frictionally engage the interior edge surface of the flange 79 on the collet C when the collets are brought together. Even though the spindles are driven at the same speed, the frictional engagement between the collets assures positive uniform speed. Each spindle structure includes a flanged hub 85 bolted to the inner end plate 75 of the collet and adapted to receive a driving belt 86 trained thereover. The collets may be provided with a friction brake, not shown, to bring the collet to a stop when the belt tension is released.

Spindles S and S' are driven by an electric motor 87 having pulleys 88 over which belts 86 pass as shown in Figure 3. Motor 87 is mounted on two angle iron strips 91 which in turn are pivotally mounted on support member 92 by means of bolts 93. The tension on belts 86 is released by pivoting the motor 87 upwardly which is accomplished by stepping on foot treadle 94. The treadle 94 actuates lever 95 which in turn actually lifts motor 87, as seen best in Figure 3. Thus, the belt tension is released on both belts 86 by stepping on treadle 94, and the tension on an individual belt is released by the swinging of the corresponding arm 35 to place the spindle into loading position.

A drip pan 112 is provided for diverting the fall of sizing material from spindles S and S'. Also the winding mechanism is provided with a housing 113 which has a cut-away section at its center to expose the spindles to the operator.

Actuating cylinders 45, 58, and 65 are automatically controlled by an electric timer 96, a four-way hydraulic valve 97 operated by solenoid 98 and a group of sequence valves 99a to 99h inclusive which are a part of the hydraulic system diagrammatically shown in Figure 18 and comprising essentialy a tank 101, a filter 102, a pump 103, a relief valve 104, a delay cylinder 90, and check valve 100.

As shown in Figure 19, the sequence valve 99 comprises a pressure valve 105 and a flapper valve 106. The pressure valve is adjustably loaded by turning screw 107 as needed to provide more or less tension on spring 108. Flapper valve 106 allows return flow of hydraulic fluid through the valve.

The traversing mechanism T is a conventional spiral wire apparatus such as that which is the subject of Ralph M. Stream's U. S. Patent 2,433,304. The spiral wire 109 or primary traversing mechanism causes the strand to be wound on the tube in large helices and a secondary traversing mechanism reciprocates the primary mechanism on rollers 111 to increase the width of the package.

The winder mechanism W of Figure 1 is arranged to automatically wind successive packages of strand continuously without interruption, and in the accomplishment of this, manual operations have been reduced to a minimum. Once the winding is initiated the only manual requirements are for the removal of filled packages from the winder spindles and the replacement of empty package support tubes. This is accomplished while the winding continues on a second spindle. The time interval for winding a package may be of any desired duration for instance 5 minutes to 20 minutes or longer. Thus at any time during the succeeding winding, the previously filled package may be removed so that strict attendance of an operator at the machine is unnecessary.

A clearer understanding of the cycle of operation of this apparatus may be had by referring to Figures 6 to 15 of the drawings, a general description of which follows. Figure 6 represents the position of spindles S and S' at the start of the winding operation and during the winding of the first package. The strand is moved back and forth along the package by traversing mechanism indicated at T to provide a suitable shape to the package and facilitate the subsequent removal of the strand. An empty package support tube is placed on the spindle S' in readiness for the following steps of the cycle as regards the spindle S'. As the package approaches the desired fullness the spindle S' moves forward to the position illustrated in Figure 7 and as it gains rotating speed is moved to the left to the position shown in Figure 8. This places the tubes in touching end-to-end relation and assures operation of the spindles at the same speed.

At this point in the cycle both spindles are moved to the left in unison to transfer the winding of the strand onto the spindle S'. Thus the transfer of the strand to an empty spool is effected without stopping the winding or causing the strand to break. In Figure 10 the spindles are separated by moving the spindle S to the left while still rotating at high speed. This causes the strand to break where it crosses to the spindle S' thereby completely separating the packages. Soon after the separation of the spindles, the spindle S moves out of alignment with the spindle S' to the position shown in Figure 11 where the rotary drive of the spindle is disconnected and the rotation of the spindle is allowed to diminish or the spindle is braked to a standstill. During the winding interval on spindle S' the filled package P is removed from the spindle S and replaced with an empty tube in readiness for a continuation of the cycle of operation.

Figures 12 to 15 illustrate the steps through which the spindle S moves as operation of the apparatus continues. The spindle S carrying an empty tube moves into alignment with spindle S' and then moves to the right as it reaches winding speed into contact with the second spindle (Figure 13). The two spindles then move to the right to transfer the winding to the tube on the spindle S as shown in Figure 14. In Figure 15 the spindle S' has moved to the right thus separating the tubes and breaking the strand and is in readiness to move rearwardly. Upon completion of this movement the spindle S' ceases rotation so that the package can be removed and an empty tube put in its place. This final position corresponds to the showing of Figure 6 and the beginning of a new cycle, except that the strand has automatically transferred to the spindle S and eliminated the necessity for further manual operation.

A detailed description of the operation of the apparatus follows.

In using this apparatus, the operator starts pump 103 and sets the timer 96 to the desired winding time. After this is accomplished and with arms 35 in the position shown in Figure 6, the steps upon a treadle 94 to disengage the driving belt 86 of spindle S, and after pulling the filaments by hand to attenuate them and gathering them together to form a strand 32, he threads the strand upon the tube 69 and at the same time removes the downward pressure upon treadle 94 to start the rotation of collet C. The traversing mechanism is then started and the automatic operation is under way.

Although the sequence of events illustrated in Figures 6 to 15 takes place with no cooperation of the operator, a brief description of the actual operation of the hydraulic system follows. Starting the sequence with the rotating spindle S in the winding position and the stationary spindle S' in the loading position as shown in Figure 6, the following train of events takes place. The solenoid operated four-way valve directs hydraulic fluid under pressure from pump 103 to actuating cylinder 65 of spindle S'. The actuation of this cylinder moves arm 35 of S' forward, see Figure 7. When S' is fully forward the pressure in the line from the pump rises until sequence valve 99a opens directing oil under pressure to actuating cylinder 45 for spindle S' and to delay cylinder 90. The piston of unloaded delay cylinder 90 moves first to the limit of its throw and then actuating cylinder 45 of spindle S' is actuated. The time consumed in actuating delay cylinder 90 allows spindle S' to come up to speed before cylinder 45 of spindle S' moves collet C' into contact with rotating collet C, see Figure 8.

After the collets are in contact, the pressure in the line again rises until sequence valve 99b opens which directs oil under pressure to actuating cylinder 58 which traverses the plate 42 that supports both spindles S and S'. Traversing plate 42 brings spindle S' into the winding position formerly held by spindle S, see Figure 9.

When cylinder 58 reaches the end of its stroke, the pressure in the line again rises and opens sequence valve 99c which directs oil under pressure to actuating cylinder 45 of spindle S. The spindle S is thereby moved away from contact with spindle S', see Figure 10. Again the pressure rises, sequence valve 99d opens and actuating cylinder 65 of spindle S moves arm 35 of spindle S into the loading position, see Figure 11.

The timer 103 and solenoid 98 then move four-way valve 97 into the position shown in dotted lines in Figure 18 and oil under pressure is directed to the actuating cylinder 65 of spindle S. The action of this sylinder 65 returns spindle S to its forward position, see Figure 12. Sequence valve 99e opens and actuating cylinder 45 of spindle S is operated to bring the collets C and C' together after delay cylinder 90 has been operated. Actuating cylinders 58 and actuating cylinders 45 and 65 of spindle S' are then actuated in that order along with the appropriate action of sequence valves 99f, 99g, and 99h to achieve the relative positions of the spindles as shown in Figures 13, 14, and 15. The spindles S and S' may be braked to a standstill when in the loading position by a brake which is actuated by the swinging of arm 35 or by other suitable means, not shown.

It is readily apparent that an automatically timed and continuous winding operation has been made possible by the apparatus of this invention.

Although a specific embodiment of the invention has been described in quite some detail, it is not intended that the invention be limited thereto; rather, obvious variations and modifications can be made within the spirit and scope of the appended claims.

We claim:

1. Winding apparatus comprising a base member, a plate member movably supported on said base member, means for traversing said plate member on said base member, a pair of spindles upon which a strand may be wound, said spindles being arranged in end-to-end relationship with their axes parallel to the direction of traverse of said plate member and each of said spindles being secured at the free end of an arm pivotally mounted on said plate member, means for individually pivoting said arms in a direction normal to the traverse of said plate member, means for traversing said arms on said plate member in a direction parallel to axes of said spindles to make and break end-to-end engagement of said spindles, and means for rotating said spindles.

2. Winding apparatus comprising a base member, a plate member movably supported on said base member, a pair of arms pivotally mounted side by side on said plate member, a spindle secured at the free end of each of said arms, said spindles being arranged in end-to-end relationship with their axes parallel to the direction in which said plate member is movable on said base member, means for rotating said spindles, and hydraulic means for positioning said spindles comprising means for moving said plate member on said base member, means for pivoting said arms in a direction normal to the direction in which said plate member is movable on said base member, and means for traversing said arms on said plate member in a direction parallel to axes of said spindles to move said spindles into and out of end-to-end engagement.

3. Winding apparatus comprising a pair of adjacent arm and spindle assemblies, said pair of assemblies comprising two arms mounted on a common axis on a plate member and on the free end of each arm a spindle, said arms being individually pivotable on said common axis and movable along said common axis to change the distance between said arms, said spindles being in an end-to-end engaging relationship when in winding position, and hydraulic means for moving said spindles into and out of winding position comprising means for moving said arms along their common axis to change the distance between said arms, means for pivoting said arms on their common axis, and means for traversing said plate member in a direction parallel to said common axis.

4. Winding apparatus comprising a base member, a plate member movably supported on said base member, means for moving said plate member laterally across said base member, a pair of slidably engageable spindles adapted for winding a strand thereon, a pair of arms for supporting said spindles, said arms pivotally mounted on a common axis on said plate member and adapted for swinging said spindles into and out of winding position through parallel planes both of which are normal to movement of said plate member on said base member and also adapted for independent movement along their pivotal axis to bring said spindles into end-to-end frictional engagement, means for moving said arms along their pivotal axis to bring said spindles into end-to-end engagement, means for swinging said arms into and out of winding position, and means for rotating said spindles.

5. Winding apparatus comprising a pair of side-by-side spindles each of which is adapted for receiving a spool upon which a strand may be wound, means for rotating said spindles and the spools thereon, means for traversing both of said spindles simultaneously in the same direction to introduce the strand to be wound upon one and then the other of said spools, and means for individually swinging said spindles transversely to the direction of traverse to permit removal of a filled spool from said spindle and replacement with an empty spool.

6. Apparatus for continuous winding of a strand comprising a pair of side-by-side spindles arranged on a common axis when in a winding position, means for traversing said spindles while in end-to-end engagement to transfer the winding strand from one spindle to another, means for moving said spindles into and out of end-to-end engagement, means for individually swinging said spindles transversely to the direction of traverse to position said spindle for unloading, and means for rotating said spindles when in the winding position.

7. Apparatus for automatic, continuous winding of a strand comprising a pair of side-by-side spindles arranged on a common axis when in the winding position, means for rotating said spindles when in winding position, means for traversing said spindles while in end-to-end engagement to transfer the winding strand from one spindle to another, means for moving said spindles into and out of end-to-end engagement, means for individually swinging said spindles transversely to the direction of traverse to position said spindle for unloading, said means for traversing and swinging said spindles comprising hydraulic means.

8. In an automatic apparatus for continuous winding of a strand comprising a pair of rotatable spindles arranged side by side when in a winding position and mounted at the end of a pair of arms pivoted on a common axis and adapted for swinging said spindles into winding and unloading positions, a hydraulic system means for moving said arms laterally in a direction parallel to said common axis and for pivoting said arms into and out of said winding position.

9. Method of continuously winding a strand comprising arranging a primary and secondary spindle side by side with said primary spindle in position for winding said strand, threading said strand on said primary spindle and rotating said primary spindle to wind a strand package thereon, causing said secondary spindle to rotate at the speed of said primary spindle, traversing said primary and secondary spindles simultaneously to move said secondary spindle into position for winding said strand, removing said primary spindle from the position adjacent said secondary spindle, removing the strand package from said primary spindle after said primary spindle has stopped rotation, returning said primary spindle to a position adjacent said secondary spindle and repeating said traversing and unloading steps.

RALPH M. STREAM.
IVAN G. BRENNER.

REFERENCES CITED

The following references are of record in the file of this patent:

UNITED STATES PATENTS

| Number | Name | Date |
|---|---|---|
| 915,333 | Chandler | Mar. 16, 1909 |
| 1,393,286 | Hosford | Oct. 11, 1921 |
| 2,424,021 | Cook | July 15, 1947 |
| 2,524,623 | Colombu | Oct. 3, 1950 |

FOREIGN PATENTS

| Number | Country | Date |
|---|---|---|
| 831,631 | France | June 13, 1938 |